US008625126B2

(12) United States Patent  (10) Patent No.: US 8,625,126 B2
Yasuhara  (45) Date of Patent: Jan. 7, 2014

(54) MANAGEMENT OF RECORDING MEDIUM STORAGE WHEN OUTPUTTING PRINT JOB LOG INFORMATION (75) Inventor: Hiroshi Yasuhara, Kawasaki (JP)

(73) Assignee: Canon Kabushiki Kaisha (JP)

( * ) Notice: Subject to any disclaimer, the term of this patent is extended or adjusted under 35 U.S.C. 154(b) by 996 days.

(21) Appl. No.: 12/263,951

(22) Filed: Nov. 3, 2008

(65) Prior Publication Data

US 2009/0116061 A1 May 7, 2009

(30) Foreign Application Priority Data

Nov. 5, 2007 (JP) .................................. 2007-287850

(51) Int. Cl.
G06F 3/12 (2006.01)
G06F 3/00 (2006.01)
H04L 29/06 (2006.01)
G06K 9/00 (2006.01)

(52) U.S. Cl.
USPC .......... 358/1.15; 356/1.14; 356/1.16; 710/15; 713/161; 382/100

(58) Field of Classification Search
None
See application file for complete search history.

(56) References Cited

U.S. PATENT DOCUMENTS

| 5,602,933 | A | * | 2/1997 | Blackwell et al. ............ 382/116 |
| 5,960,460 | A | * | 9/1999 | Marasco et al. .............. 711/162 |
| 5,978,477 | A |  | 11/1999 | Hull et al. |
| 7,516,102 | B2 |  | 4/2009 | Takamine |
| 7,576,883 | B2 | * | 8/2009 | Ragnet et al. ................. 358/1.15 |
| 7,586,635 | B2 | * | 9/2009 | Maeda et al. ................. 358/1.15 |
| 7,623,253 | B1 |  | 11/2009 | Oyama et al. |
| 7,698,471 | B2 | * | 4/2010 | Aoki et al. ....................... 710/15 |
| 2002/0023084 | A1 |  | 2/2002 | Eyal et al. |
| 2002/0120875 | A1 |  | 8/2002 | Kiwada et al. |
| 2002/0159092 | A1 |  | 10/2002 | Christodoulou et al. |
| 2003/0196090 | A1 |  | 10/2003 | Nagahama |
| 2003/0231331 | A1 |  | 12/2003 | Tanaka |

(Continued)

FOREIGN PATENT DOCUMENTS

JP 6-268791 A 9/1994
JP 2002016788 A 1/2002

(Continued)

OTHER PUBLICATIONS

Office Action issued in corresponding Japanese Patent Application No. 2007-287850 dated Sep. 28, 2009.

(Continued)

Primary Examiner — Steven Kau
(74) Attorney, Agent, or Firm — Rossi, Kimms & McDowell LLP (57) ABSTRACT An output job in an image forming apparatus not connected to a network is managed. To accomplish this, an image forming apparatus in an image forming system includes an input unit which inputs document data stored in a recording medium, a verification unit which verifies the validity of the document data on the basis of verification information associated with the input document data, an output unit which forms and outputs an image on a print medium on the basis of the document data, and an output log storing control unit which, when it is determined that the document data is valid, stores, in the recording medium, output log information containing no output image, and when it is determined that the document data is invalid, stores output log information containing the output image in the recording medium.

8 Claims, 9 Drawing Sheets

(56) References Cited

U.S. PATENT DOCUMENTS

| | | | |
|---|---|---|---|
| 2003/0234952 A1* | 12/2003 | Abe | 358/1.14 |
| 2005/0111051 A1 | 5/2005 | Uchikawa | |
| 2005/0134897 A1 | 6/2005 | Mase | |
| 2005/0144469 A1* | 6/2005 | Saitoh | 713/189 |
| 2006/0044592 A1* | 3/2006 | Wakana | 358/1.14 |
| 2006/0048019 A1* | 3/2006 | Takahashi | 714/48 |
| 2006/0279764 A1* | 12/2006 | Shimada | 358/1.14 |
| 2006/0288285 A1* | 12/2006 | Lai et al. | 715/708 |
| 2006/0290975 A1 | 12/2006 | Murakami et al. | |
| 2007/0118760 A1 | 5/2007 | Masui | |
| 2007/0133054 A1 | 6/2007 | Kobayashi et al. | |
| 2007/0285712 A1 | 12/2007 | Komada | |
| 2009/0116061 A1 | 5/2009 | Yasuhara | |
| 2011/0255132 A1 | 10/2011 | Shimada | |

FOREIGN PATENT DOCUMENTS

| | | |
|---|---|---|
| JP | 2002-358244 A | 12/2002 |
| JP | 2003-023517 A | 1/2003 |
| JP | 2003-304243 A | 10/2003 |
| JP | 2006081119 A | 3/2006 |
| JP | 3821293 B2 | 6/2006 |
| JP | 2006-246350 A | 9/2006 |

OTHER PUBLICATIONS

Japanese Office Action cited in JP 2006-162809, dated Apr. 28, 2011. (JPOA cited in related co-pending application US 2007-0285712).

Japanese Office Action cited in corresponding JP 2007-287850, previously cited an IDS dated Oct. 15, 2009, without an English translation. English translation is submitted herewith.

Michael J. Shelton, et al.; "Thumbnail or encoding history of jobs copied/printed/sent for audits"; Research Disclosure Journal, ISSN 0374-4353, Research Disclosure Database No. 473025; Sep. 2003.

* cited by examiner

| Index 501 | In/Out 502 | date 503 | User Name 504 | File Name 505 | File Size 506 | Mgmt Level 507 | Status 508 | File URL 509 | Device 510 | Job 511 | OutDate |
|---|---|---|---|---|---|---|---|---|---|---|---|
| 1 | In | 2006/10/1 | User1 | File A.pdf | 30000 | 1 | upload | /file/20061001/FileA.pdf | | | |
|  | Out | 2006/10/3 | User1 | | | | complete | | URL DeviceA | Print | 2006/10/2 |
| 2 | In | | | | | | | | | | |
|  | Out | 2006/10/4 | User1 | File B.doc | | 0 | complete | /file/20061001/FileB.pdf | URL DeviceC | Print | 2006/10/2 |
| 3 | In | 2006/10/2 | User3 | File C.txt | 4000 | 1 | upload | /file/20061002/FileC.txt | – | – | |
|  | Out | | | | | | | | | | |

MANAGEMENT OF RECORDING MEDIUM STORAGE WHEN OUTPUTTING PRINT JOB LOG INFORMATION

BACKGROUND OF THE INVENTION

1. Field of the Invention

The present invention relates to a management technology for document data output from an image forming apparatus.

2. Description of the Related Art

In an office, copy machines are widely used as an image forming apparatus for printing out document data obtained by reading a document. These days, among such apparatuses, a growing number of image forming apparatuses have a facsimile function, a printer function, a function of transmitting a read image as data to a terminal, and a function of reading and outputting image data saved in a portable recording medium. Further, it has become popular in recent years to output business documents using an image forming apparatus not only in an office but also in public places such as convenience stores. Also, it has become popular to store business documents in a portable recording medium, connect to an image forming apparatus present in a public place, and output an image.

Recently, confidential information leakage in has become a serious problem in offices. To prevent leakage of confidential information in an office, many software programs having a function of monitoring printout, mail sending/reception, file copying, and the like are commercially available. As a method of preventing leakage of confidential information in the form of a paper medium, there is proposed a technique of saving image data of a document and data (date and time of copying, user, location, and the like) about an output job of the image in association with each other to enable later tracking, as disclosed in Japanese Patent No. 3821293.

However, storage devices which manage data regarding an output job are not always connected via a network to an image forming apparatus present in a public place. If an image forming apparatus not connected to a storage device via a network outputs data, it cannot transmit data regarding the output job to an external server, and thus fails in data management of that output job against leakage of confidential information.

It is also possible to store data regarding an output job in a portable recording medium and recover the information in an office. However, when document data is saved as data regarding an output job, the data size may become large, and the data may not be storable in a portable recording medium. Japanese Patent No. 3821293 proposes a method of preventing output itself when an area for storing information regarding an output job cannot be ensured in the storage area. However, output failure may decrease business efficiency and hinder the business itself.

The present invention has been made in consideration of the above situation, and has as its object to enable data management of an output job even in an image forming apparatus not connected to a network.

SUMMARY OF THE INVENTION

The present invention can provide a technique capable of data management of an output job in an image forming apparatus not connected to a network.

According to one aspect of the present invention, an image forming system includes a client apparatus which generates document data, an image forming apparatus which forms and outputs an image on a print medium on the basis of input document data, and a management server apparatus which manages outputs of document data, the client apparatus comprising: a generating unit which generates document data; a transmitting unit which transmits document data to be managed to the management server apparatus; a receiving unit which receives verification information-added document data from the management server apparatus; and a storing unit which stores the document data in a recording medium, the management server apparatus comprising: an accepting unit which accepts the document data to be managed from the client apparatus; a registering unit which registers the accepted document data in a management table; and an adding unit which adds verification information to the accepted document data, and the image forming apparatus comprising: an input unit which inputs the document data stored in the recording medium; a verification unit which verifies validity of the document data on the basis of verification information associated with the input document data; an output unit which forms and outputs an image on a print medium on the basis of the document data; and a storing control unit which, when the verification unit determines that the document data is valid, stores, in the recording medium, output log information containing no image output from the output unit, and when the verification unit determines that the document data is invalid, stores output log information containing the image in the recording medium.

According to another aspect of the present invention, an image forming apparatus comprises: an input unit which inputs document data stored in a recording medium; a verification unit which verifies validity of the document data on the basis of verification information associated with the input document data; an output unit which forms and outputs an image on a print medium on the basis of the document data; and an output log storing control unit which, when the verification unit determines that the document data is valid, stores, in the recording medium, output log information containing no image output from the output unit, and when the verification unit determines that the document data is invalid, stores output log information containing the image in the recording medium.

According to still another aspect of the present invention, a method of controlling an image forming apparatus, the method comprises: an input step of inputting document data stored in a recording medium; a verification step of verifying validity of the document data on the basis of verification information associated with the input document data; an output step of forming and outputting an image on a print medium on the basis of the document data; and an output log storing control step of, when the document data is determined in the verification step to be valid, storing, in the recording medium, output log information containing no image output in the output step, and when the document data is determined to be invalid, storing output log information containing the image in the recording medium.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Preferred embodiments of the present invention will be described in detail below with reference to the accompanying drawings. The following embodiments are merely examples, and do not limit the scope of the present invention.

(First Embodiment)
<System Configuration>

Figure 1:
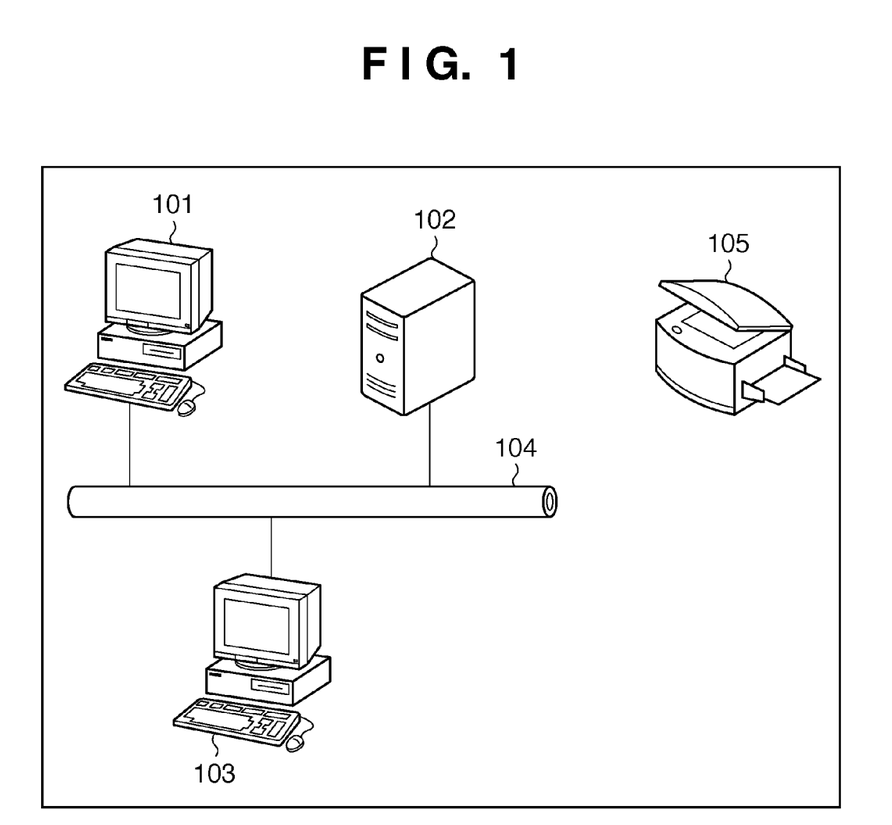
FIG. 1 is a schematic view showing the overall configuration of an image forming system including an image forming apparatus according to the first embodiment.

FIG. 1 is a schematic view showing the network configuration of an image forming system according to the first embodiment. Information processing apparatuses 101 and 103 are client apparatuses, and an output job information management server 102 has a management unit which manages output job information.

The client apparatus 101 or 103 generates document data, and transmits it to the management server 102 via a network 104. The management server 102 registers the document data, and transmits the registered document data to the client apparatus 101 or 103. The client apparatus 101 or 103 stores the registered document data in a portable recording medium.

The portable recording medium which stores document data is connected to an image forming apparatus 105, and the image forming apparatus 105 prints out the stored document data. The image forming apparatus 105 stores output job information upon printout in the portable recording medium. The image forming apparatus 105 need not be connected to the client apparatuses 101 and 103 and management server 102 via a network, but may also be connected.

The above-described portable recording medium suffices to be a readable/writable storage medium, such as a USB memory or SD card, which is detachable from the client apparatuses 101 and 103 and image forming apparatus 105.

The client apparatuses 101 and 103 have a function of acquiring output job information from a portable recording medium. When the client apparatuses 101 and 103 acquire output job information from the portable recording medium, they transmit it to the management server 102. The management server itself 102 may also have a function of acquiring output job information from a portable recording medium.

Figure 10:
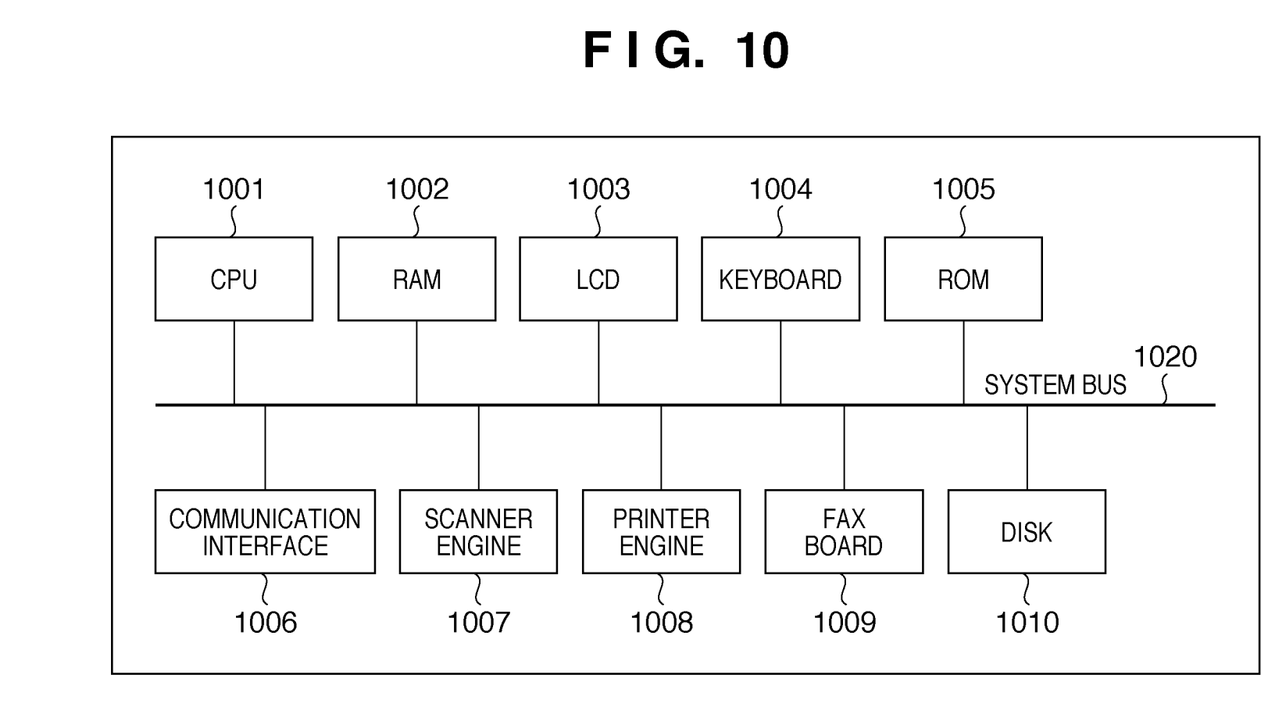
FIG. 10 is a block diagram showing the internal arrangement of the image forming apparatus.

FIG. 10 is a block diagram showing the internal arrangement of the image forming apparatus 105.

A communication interface 1006 allows a CPU 1001 to communicate with the outside of the image forming apparatus. The communication interface 1006 is, for example, a USB interface, Ethernet® interface, or interface. The communication interface 1006 may also be another arbitrary communication interface.

A scanner engine 1007 is a functional unit which reads a paper document as electronic data. A printer engine 1008 is a functional unit which prints and forms an image on a paper medium on the basis of electronic data. The printer engine 1008 is, for example, a laser beam printer or inkjet printer, but may also be another printer. A FAX board 1009 implements a FAX function of transmitting and receiving an image via a telephone line.

An LCD 1003 and keyboard 1004 are user interfaces for notifying the user of information or accepting an input from the user. The LCD 1003 may also have a touch panel function and accept an input from the user.

These hardware units are connected to each other via a system bus 1020, and controlled by the CPU 1001.

The image forming apparatus 105 allows the user to select the printer engine 1008 and issue a print job. Also, the image forming apparatus 105 allows the user to select the scanner engine 1007 and issue a scan job. The image forming apparatus 105 allows the user to select the printer engine 1008 and scanner engine 1007, and issue a copy job.

In addition, the image forming apparatus 105 allows the user to select the printer engine 1008 or scanner engine 1007 and the FAX board 1009, and issue a FAX reception job and FAX transmission job.

The image forming apparatus 105 acquires document data via the communication interface 1006, and executes a print job using the printer engine 1008. The image forming apparatus 105 acquires document data via the communication interface, and executes a FAX transmission job.

For example, when a portable recording medium which stores document data is connected to the communication interface 1006, the CPU 1001 acquires document data from the portable recording medium via the communication interface 1006. The CPU 1001 forms and outputs, on a print medium such as paper, an image based on document data acquired using the printer engine 1008.

Programs which run in the image forming apparatus 105 are stored in a ROM 1005 or DISK 1010. If necessary, a program is loaded to a RAM 1002 and executed by the CPU 1001. In addition to control programs, the ROM 1005 and DISK 1010 store attribute information representing the function and status of a job processed by the image forming apparatus 105 and a multi-functional peripheral. Further, the ROM 1005 and DISK 1010 store job data to be output, and the like.

Figure 11:
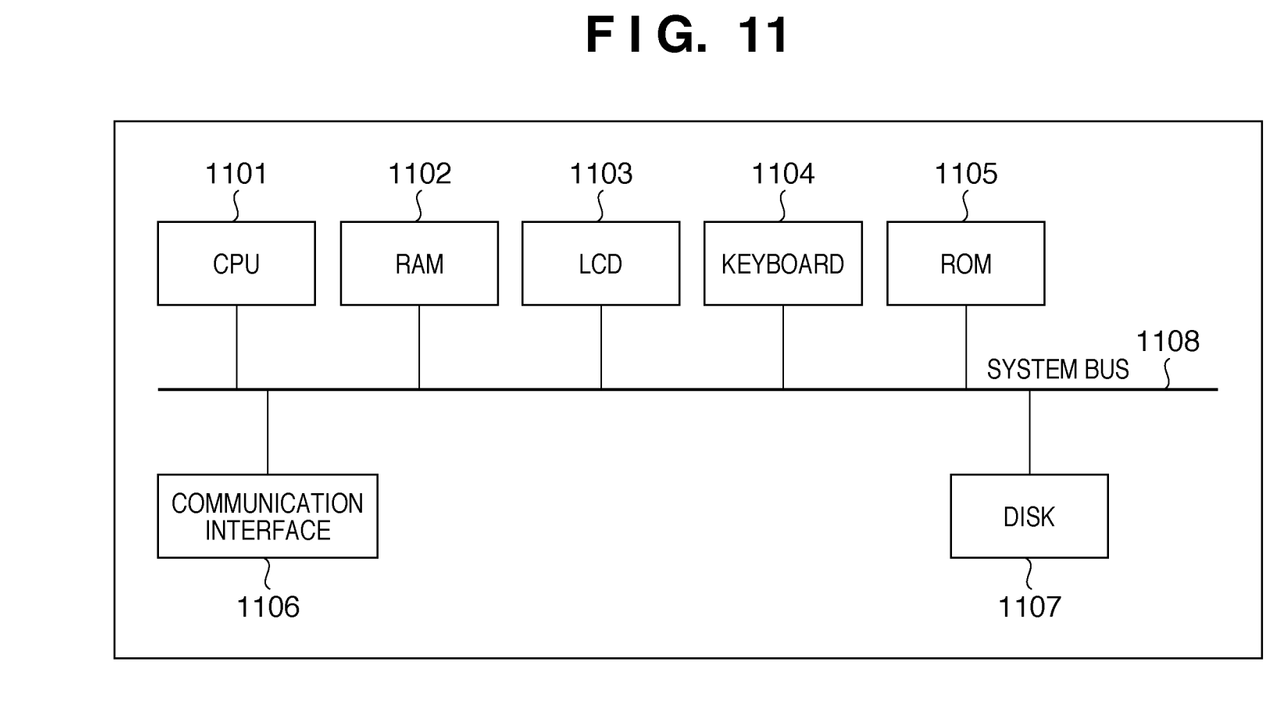
FIG. 11 is a block diagram showing the hardware configuration of the client apparatus and management server.

FIG. 11 is a block diagram showing the hardware configuration of the client apparatuses 101 and 103 and management server 102. In the first embodiment, the client apparatuses 101 and 103 and management server 102 are implemented by executing software on a personal computer (PC) which is a general information processing apparatus. The hardware configuration is identical between the client apparatuses 101 and 103 and the management server 102, so the client apparatus 101 will be explained.

Programs which control the client apparatus 101 are stored in a ROM 1105 or DISK 1107. If necessary, a program is loaded to a RAM 1102 and executed by a CPU 1101. In addition to control programs, the ROM 1105 and DISK 1107 store document data to be printed by the image forming apparatus 105, management information for managing output job information, and output job information.

A communication interface 1106 allows the CPU 1101 to communicate with the outside of the client apparatus 101. The communication interface 1106 is, for example, a USB interface, Ethernet® interface, or interface. The communication interface 1106 may also be another arbitrary communication interface. In the following description, communication with a portable recording medium uses a USB interface, and communication between the client apparatuses or between the client apparatus and the management server uses an Ethernet® interface.

An LCD 1103 and keyboard 1104 are user interfaces for notifying the user of information or accepting an input from the user. The LCD 1103 may also have a touch panel function and accept an input from the user.

These hardware units are connected to each other via a system bus 1108, and controlled by the CPU 1101.

Figure 2:
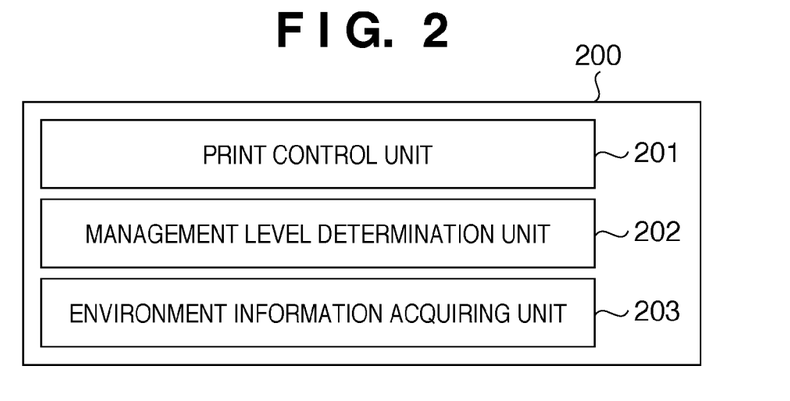
FIG. 2 is a functional block diagram of the image forming apparatus.

FIG. 2 is a block diagram of functional blocks implemented by executing software on the image forming apparatus 105.

A print control unit 201 controls the communication interface 1006, the LCD 1003, the keyboard 1004, the printer engine 1008, a management level determination unit 202, and an environment information acquiring unit 203.

The print control unit 201 acquires document data from the portable recording medium via the communication interface 1006. The print control unit 201 outputs document data to the management level determination unit 202 (to be described later), and determines, in accordance with a management level determined by the management level determination unit 202, whether to handle, as output job information, document data and environment information obtained from the environment information acquiring unit. Based on the status of a portable recording medium connected to the communication interface 1006, the print control unit 201 determines and controls whether to output a document via the printer engine 1008.

The management level determination unit 202 acquires document data from the print control unit 201 and a certificate, and determines the management level of the document data. The certificate may also be data separated from document data, or stored in associated document data. When signature verification of document data using a certificate is successful, the management level determination unit 202 determines "management level 1" as the management level. If signature verification fails or only document data is acquired, the management level determination unit 202 determines the management level to be "management level 0". The criterion of the management level is not limited to the signature verification, and the management level associated with a document may also be determined by another method.

The environment information acquiring unit 203 acquires environment information of a job output from the print control unit 201. The environment information includes, for example, the date and time of issue of a job, and the size of document data. The environment information further includes the name of a user who outputs document data, the document data management level determined by the management level determination unit 202, the serial number of an image forming system for output, and the installation location. However, the environment information is not limited to these types of information, and a combination of arbitrary types of information used in the image forming apparatus 105 is available.

Upon completion of executing a designated job, when document data of "management level 0" is output, the print control unit 201 stores "document data and environment information" as output job information in the portable recording medium via the communication interface 1006. When document data of "management level 1" is output, the print control unit 201 stores only "environment information" as output job information in the portable recording medium via the communication interface 1006.

The print control unit 201 may also take the following arrangement. That is, before executing a job, the print control unit 201 acquires in advance acquirable environment information from the environment information acquiring unit 203, and stores it in the portable recording medium via the communication interface 1006. Upon completion of executing the job, the print control unit 201 acquires additional information from the environment information acquiring unit 203, and adds it via the communication interface 1006 to the information stored in the portable recording medium.

Figure 3:
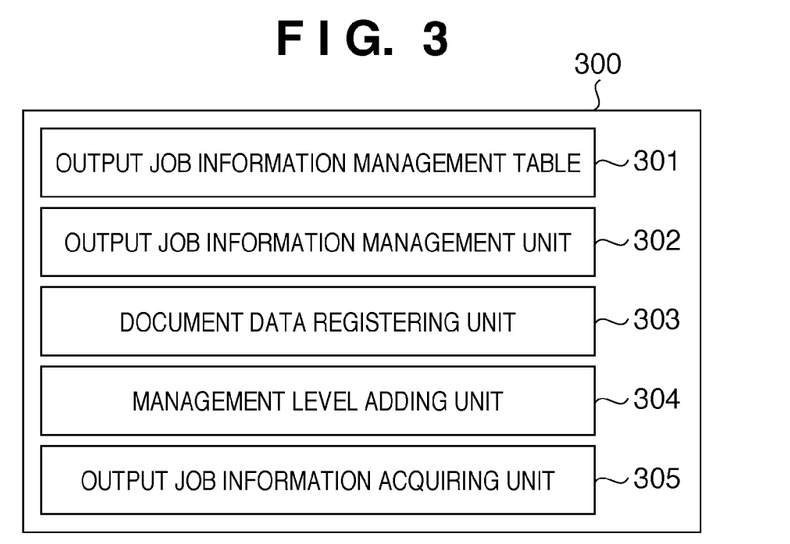
FIG. 3 is a functional block diagram of a management server.

FIG. 3 is a block diagram of functional blocks implemented by executing software in the management server 102.

An output job information management table 301 holds environment information of an output job, document data of the output job, and status information. An output job information management unit 302 manages the output job information management table 301.

A document data registering unit 303 receives document data from the client apparatus 101 or 103 via the communication interface 1106. The document data registering unit 303 registers document data in the output job information management table 301 via the output job information management unit 302. When the document data registering unit 303 registers document data, the output job information management unit 302 registers information representing that the document data has been registered in status information of the output job information management table 301. After registering the information, the document data registering unit 303 outputs the document data to a management level adding unit 304. When the document data registering unit 303 receives document data to which management level information is added by the management level adding unit 304, it transmits the management level information-added document data to the client apparatus 101 or 103 via the communication interface 1106.

The management level adding unit 304 receives document data registered in the management table from the document data registering unit 303, and adds a management level. In the first embodiment, the management level is determined based on signature information, as described in the description of the print control unit 201. Upon receiving document data from the document data registering unit 303, the management level adding unit 304 acquires key data from the output job information management unit, and executes signature adding processing for the document data by using the key data. After adding signature information to the document data, the management level adding unit 304 sends back the signature information-added document data to the document data registering unit. As the "key data", a private key in public key cryptography is available.

An output job information acquiring unit 305 receives output job information from the portable recording medium via the communication interface 1106. The output job information acquiring unit 305 registers the output job information in the output job information management table 301 via the output job information management unit 302.

Figure 4:
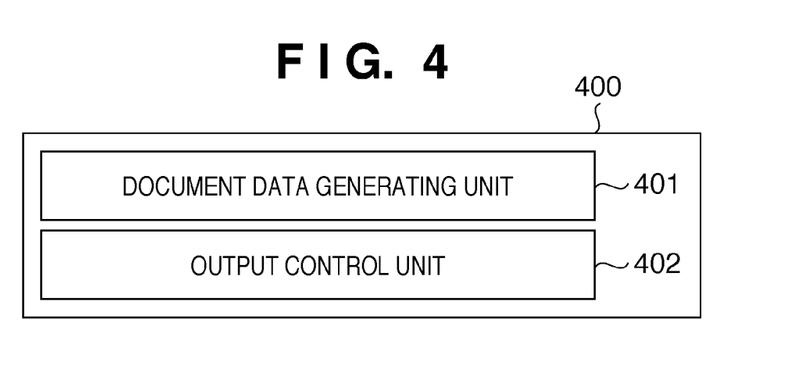
FIG. 4 is a functional block diagram of a client apparatus.

FIG. 4 is a block diagram of functional blocks implemented by executing software in the client apparatuses 101 and 103.

A document data generating unit 401 generates document data from an image generated by a program stored in the DISK 1107, RAM 1102, or ROM 1105. Programs stored in the DISK 1107, RAM 1102, and ROM 1105 are a document creation program and photographic data editing program, but are not limited to them.

An output control unit 402 transmits document data to be managed out of a document generated by the document data generating unit 401 to the management server 102 via the communication interface 1106. The output control unit 402 receives document data to which the management level is added by the management server 102, and stores the document data in the portable recording medium via the communication interface 1106.

The output control unit 402 can also directly store document data generated by the document data generating unit 401 in the portable recording medium via the communication interface 1106. In this case, neither a signature nor a management level is added to the document data.

Figure 5:
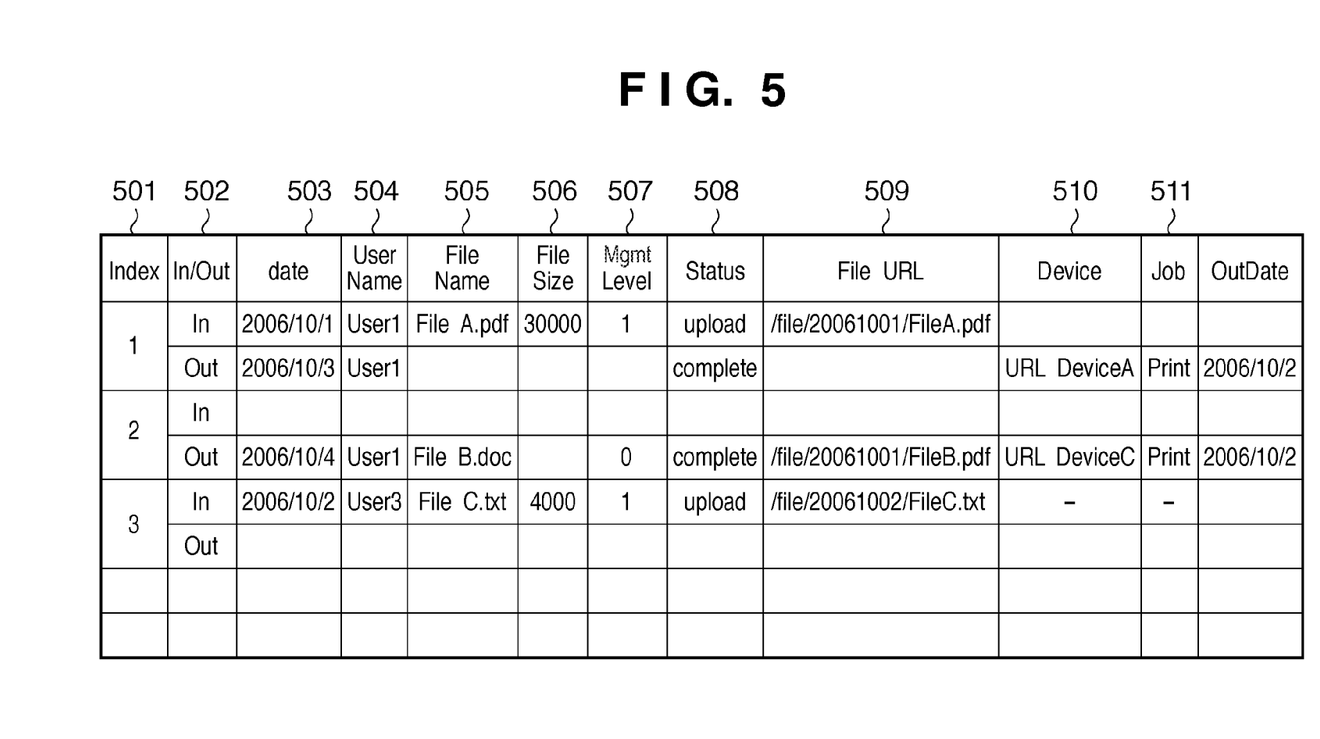
FIG. 5 is a table showing an example of an output job information management table managed by the management server.

FIG. 5 is a table showing an example of the output job information management table 301 managed by the management server 102.

Two attributes In and Out (to be described later) are defined for one Index 501. An attribute 502 represents whether data is document data or output job information. Information In is input when document data is registered. Information Out is input when output job information is registered, that is, when the image forming apparatus 105 prints.

As a date 503, when the attribute 502 is In, a date and time when an output job was registered in the information management table is added. When the attribute 502 is Out, a date and time when output job information was registered is added. A user name 504 is information of a user who registered data when the attribute 502 is In, and information of a user who output data when the attribute 502 is Out. As a file name 505, the file name of document data registered by the user in the document data registering unit is registered.

As a file size 506, the file size of registered document data is registered. A management level 507 is "management level 1" for FileA.pdf corresponding to the Index 501=1 and FileC.txt corresponding to the Index 501=1, and "management level 0" for FileB.doc. Note that "management level 0" is registered when no document data is registered in the management server 102 and the image forming apparatus 105 handles environment information and document data as output job information.

As a status 508, information "upload" is added when document data of "management level 1" is registered, and information "complete" is added when output job information is registered. As a file location 509, the file path of registered document data is registered. Information is added to In when document data is registered in advance, and Out when document data is registered upon acquiring output job information. As a Device 510, information representing the device name and location is registered. More specifically, the information is added to Out upon acquiring output job information.

A Job 511 represents the type of job. In the example of FIG. 5, information representing that Device A and Device C printed FileA.pdf and FileB.doc, respectively.

In the example of FIG. 5, jobs corresponding to Index 501=1 and 2 have already been completed. The output job information acquiring unit 305 has acquired output job information from the portable recording medium, and the output job information management unit 302 has registered the information in the output job information management table 301. In contrast, as for a job corresponding to Index 501=3, document data has been registered in the output job information management unit 302 via the document data registering unit 303, but no output job information has been registered yet in the output job information management table 301.

By managing this table in the management server 102, each job takes the following three states:

Registered in only In: Document data is registered in advance in the management server 102, but the completion of outputting the document data is not confirmed. For example, the user keeps bringing out document data.

Registered in only Out: Document data is not registered in advance in the management server 102, but output job information is registered upon completion of outputting the document data.

Registered in In and Out: Document data is registered in advance in the management server 102, and output job information is registered upon completion of outputting the document data.

<System Operation>

Figure 6:
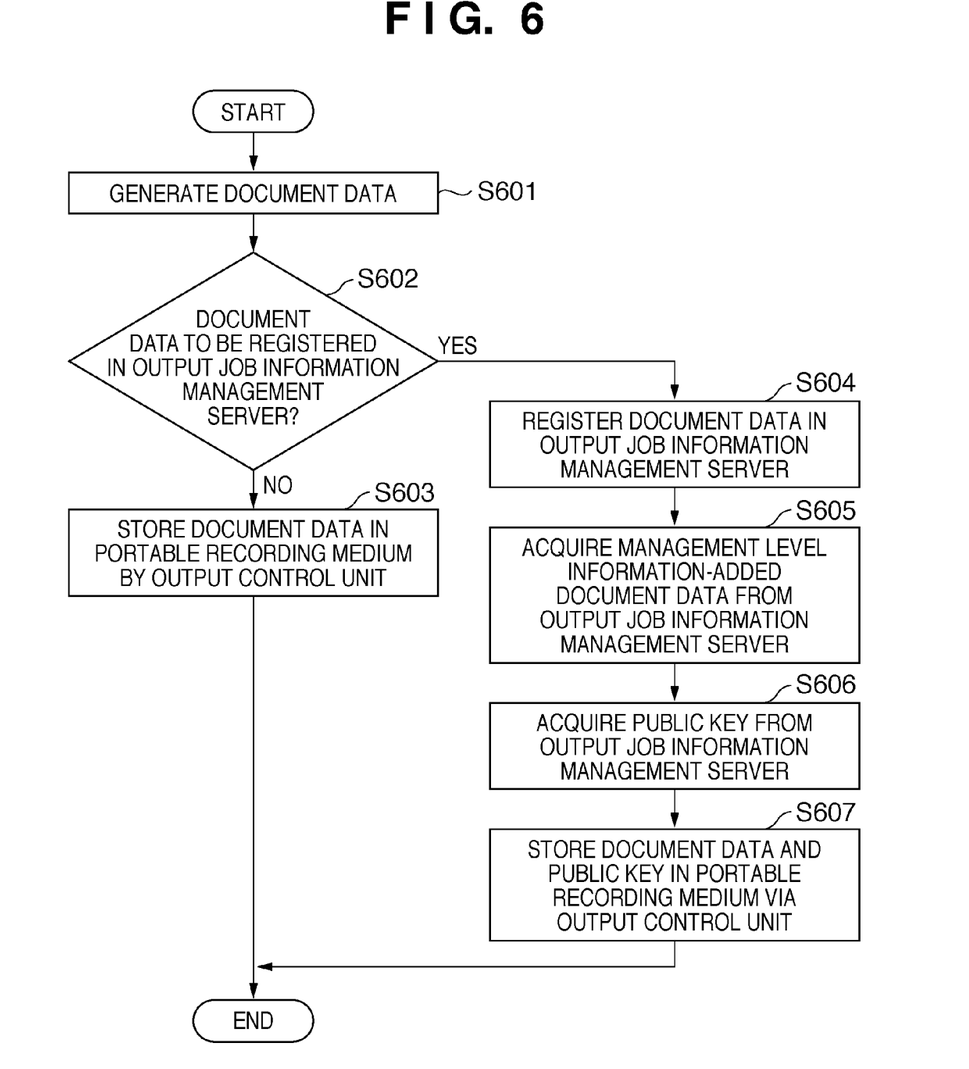
FIG. 6 is a flowchart showing an operation sequence in the client apparatus.

FIG. 6 shows an operation sequence in the client apparatus 101 or 103. FIG. 6 shows an operation sequence from generation of document data to storage of it in a portable recording medium. The following steps are implemented by executing a control program by the CPU 1101 of the client apparatus 101 or 103.

In step S601, the document data generating unit 401 generates document data.

In step S602, the output control unit 402 displays, to the user via the LCD 1103, a message that it is necessary to determine whether to register the document data generated in step S601 in the management server 102. The output control unit 402 receives an instruction from the user via the keyboard 1104. If the output control unit 402 has received an instruction from the user to register the document data, the process advances to step S604. If the output control unit 402 has received an instruction not to register the document data, the process advances to step S603.

In step S603, the document data generated in step S601 is stored in a connected portable recording medium via the communication interface 1106.

In step S604, the document data generated in step S601 is transmitted to the management server 102 via the communication interface 1106 together with a command which requests registration.

In step S605, management level information-added document data is received from the management server 102. As described above, in the first embodiment, the management level information is signature information (verification information) for document data.

In step S606, data is acquired to verify the validity of the document data received from the management server 102 in step S605. More specifically, the public key (or a server certificate containing a public key) of the management server 102 that is used to confirm the validity of signature information is acquired.

In step S607, the document data and public key acquired in steps S605 and S606 are stored in the portable recording medium connected via the communication interface 1106.

By this sequence, the generated document data is stored in the portable recording medium.

Figure 7:
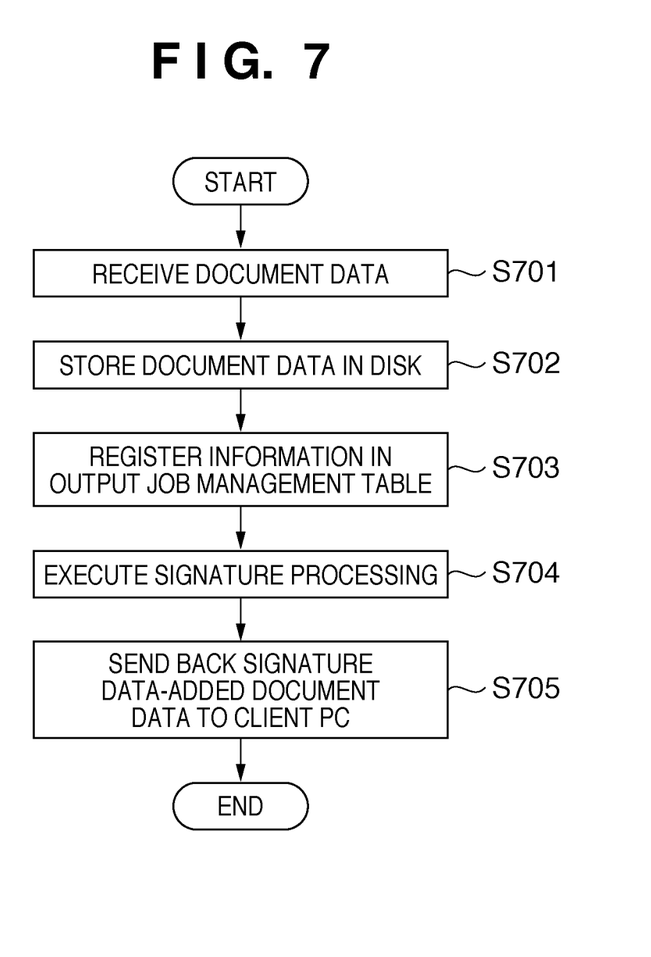
FIG. 7 is a flowchart showing an operation sequence in the management server.

FIG. 7 shows an operation sequence in the management server 102. FIG. 7 shows an operation sequence from reception of document data from the client apparatus 101 or 103 to reply of management level information-added document data to the client apparatus 101 or 103. The following steps are implemented by executing a control program by the CPU 1101 of the management server 102.

In step S701, the document data registering unit 303 receives document data from the client apparatus 101 or 103 via the communication interface 1106.

In step S702, the document data received by the document data registering unit 303 in step S701 is stored in the DISK 1107.

In step S703, information on the document data received in step S701 is registered in the output job information management table 301. More specifically, the output job information management unit 302 registers information on the document data in the output job information management table 301. The registered information includes the file path, file size, status, user name, date and time, and Index, as described with reference to FIG. 5.

In step S704, the management level adding unit 304 adds signature information to the document data registered in step S703. More specifically, the management level adding unit 304 obtains signature information by encoding (encrypting or hashing) document data by using a private key (private key in public key cryptography) unique to the management server 102.

In step S705, the public key and the document data to which the signature data is added in step S704 are transmitted to the client apparatus 101 or 103 via the communication interface 1106.

By this sequence, the management server 102 adds signature information (management level information) to document data received from the client apparatus 101 or 103, and sends back the document data.

The operation sequence of FIG. 6 in the client apparatus 101 or 103 and that of FIG. 7 in the management server 102 operate in association with each other. More specifically, document data transmitted from the client apparatus 101 or 103 in step S604 is received by the management server 102 in step S701. Management level information-added document data transmitted from the management server 102 to the client apparatus 101 or 103 in step S705 is received by the client apparatus 101 or 103 in step S605. A public key transmitted from the management server 102 to the client apparatus 101 or 103 in step S705 is received by the client apparatus 101 or 103 in step S606.

Figure 8:
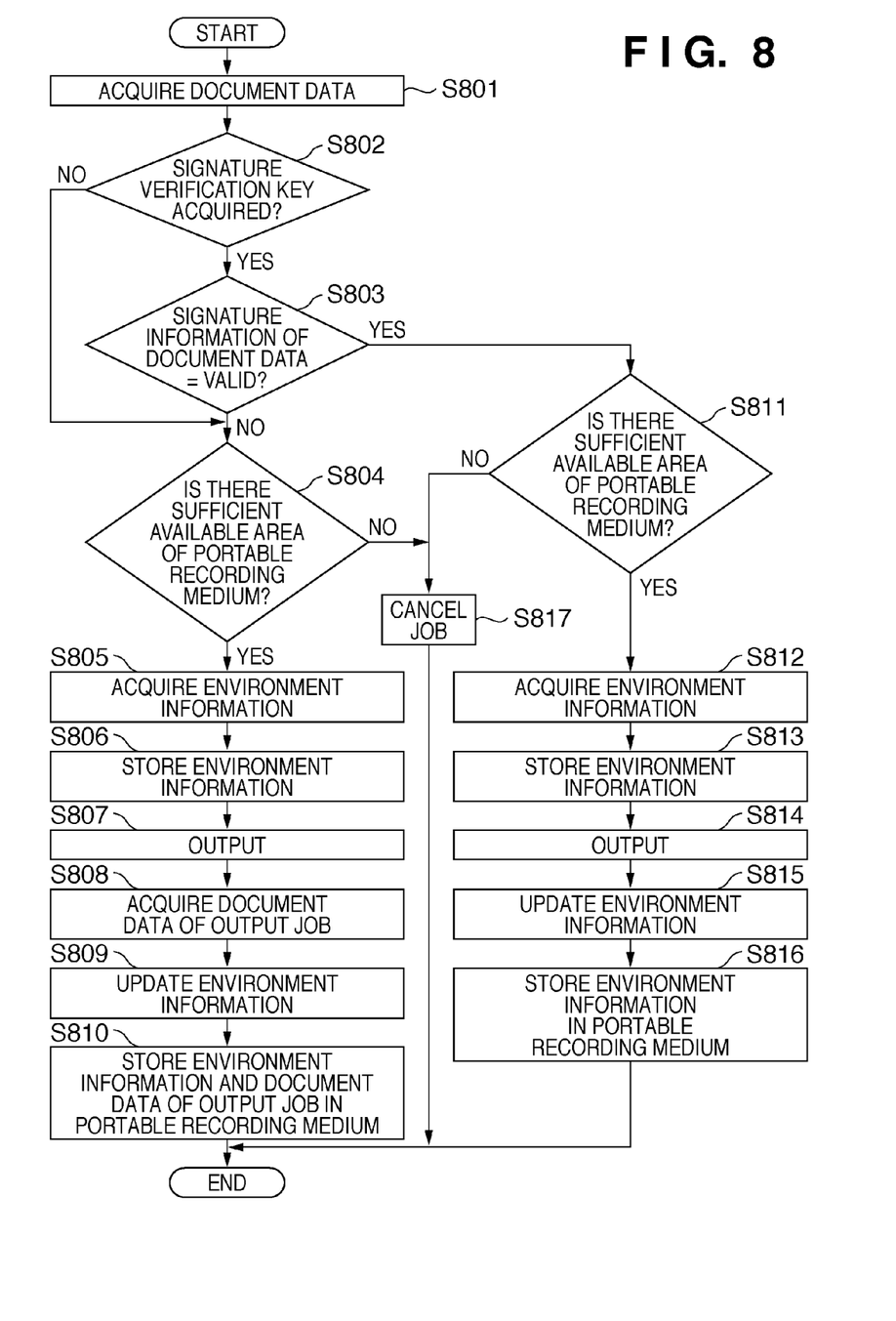
FIG. 8 is a flowchart showing an operation sequence in the image forming apparatus.

FIG. 8 shows an operation sequence in the image forming apparatus 105. FIG. 8 shows an operation sequence from acquisition of document data stored in a portable recording medium in step S607 to storage of output job information corresponding to the document data in the portable recording medium. The following steps are implemented by executing a control program by the CPU 1001 of the image forming apparatus 105.

In step S801, the print control unit 201 acquires document data from a portable recording medium connected via the communication interface 1006, and outputs it to the management level determination unit 202.

In step S802, if data for confirming the validity of signature information (verification information) can be acquired from the portable recording medium via the communication interface 1106, the print control unit 201 acquires the data. In this case, the print control unit 201 acquires the public key of the management server 102. If the print control unit 201 has acquired the public key, the process advances to step S803. If the print control unit 201 cannot acquire the public key, the document data is set to "management level 0", and the process advances to step S804.

In step S803, the management level determination unit 202 executes processing for verifying the validity of the signature information by using the document data and public key input in steps S801 and S802. If the management level determination unit 202 has failed in confirming the validity of the signature information, it sets the document data to "management level 0", and the process advances to step S804. If the management level determination unit 202 has confirmed the validity of the signature information, it sets the document data to "management level 1", and the process advances to step S811.

In step S804, the print control unit 201 determines whether the available area (i.e., free area) of the portable recording medium is large enough to store output document data information and environment information (area determination unit). If the available area is sufficient, the process advances to step S805; if it is insufficient, to step S817.

In step S805, the environment information acquiring unit 203 acquires environment information (setting information). For example, the environment information acquiring unit 203 acquires the user name, file name, device name and location, and job type.

In step S806, the print control unit 201 stores the environment information acquired in step S805 in the portable recording medium connected via the communication interface 1006.

In step S807, the output control unit forms and outputs an image based on the document data. More specifically, the document data is rasterized into image data, and printing is done on a print medium such as paper on the basis of the image data.

In step S808, the image data generated in step S807 is acquired. The reduced image (thumbnail image) of the image data generated in step S807 may also be acquired.

In step S809, the environment information acquiring unit 203 acquires status information of the output job executed in step S807.

In step S810, the print control unit 201 stores the following information. More specifically, the image data and status information acquired in steps S808 and S809 are stored as output job information (output log information) in the portable recording medium connected via the communication interface 1006 (output log storing control unit).

In step S811, the print control unit 201 determines whether the available area (i.e., free area) of the portable recording medium is large enough to store environment information (area determination unit). If the available area is sufficient, the process advances to step S812; if it is insufficient, to step S817.

In step S812, the environment information acquiring unit 203 acquires environment information (setting information). For example, the environment information acquiring unit 203 acquires the user name, file name, device name and location, and job type.

In step S813, the print control unit 201 stores the environment information acquired in step S805 in the portable recording medium connected via the communication interface 1006. The environment information may also be encoded (encrypted) using the public key acquired in step S802, and stored in the portable recording medium.

In step S814, the output control unit forms and outputs an image based on the document data. More specifically, the document data is rasterized into image data, and printing is done on a print medium such as paper on the basis of the image data.

In step S815, the environment information acquiring unit 203 acquires status information of the output job executed in step S814.

In step S816, the print control unit 201 stores the status information acquired in step S815 in the portable recording medium connected via the communication interface 1006 (output log storing control unit). The status information may also be encoded (encrypted) using the public key acquired in step S802, and stored as output job information (output log information) in the portable recording medium.

In step S817, the output job is canceled. Since the free area of the portable recording medium is insufficient to store the output log, output is inhibited to prevent a management failure.

By this sequence, the image forming apparatus 105 outputs document data stored in the portable recording medium, and stores the output log in the portable recording medium.

According to the first embodiment, when verification of signature information is successful, environment information is stored in a portable recording medium. When verification of signature information fails, environment information and document data are stored in the portable recording medium. This can reduce the possibility of running short of the area for storing document data. This can also reduce the possibility of decreasing the business efficiency upon a failure in outputting document data owing to shortage of the area for storing document data.

Figure 9:
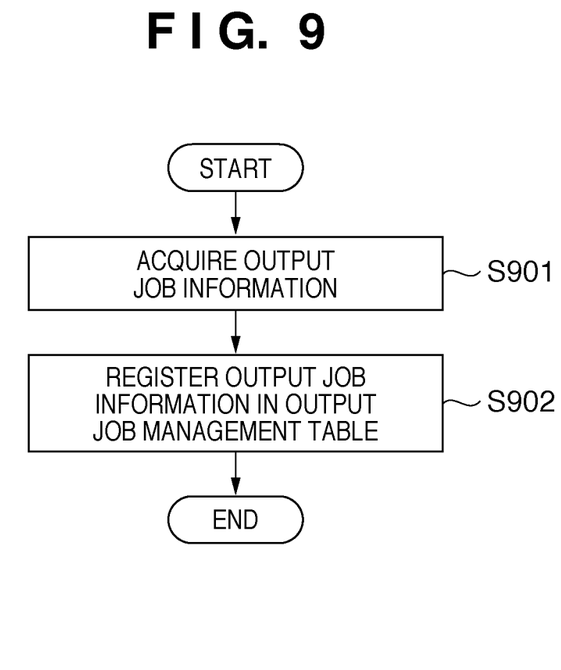
FIG. 9 is a flowchart showing an operation sequence executed by the management server after outputting an image.

FIG. 9 shows an operation sequence executed in the management server 102 after the image forming apparatus 105 outputs an image. FIG. 9 shows an operation sequence from acquisition of output job information to update of information in the output job information environment table. The following steps are implemented by executing a control program by the CPU 1101 of the management server 102.

In step S901, the output job information acquiring unit 305 acquires output job information (output log information) in a portable recording medium connected via the communication interface 1106 (log input unit). When the information has been encrypted in steps S813 and S816, it is decrypted using a private key held in the management server 102. Then, the process advances to step S902.

In step S902, the output job information management unit 302 registers the output job information (output log information) acquired in step S901 in the output job information management table 301.

The above-described image forming system can manage an output job in an image forming apparatus 105 not connected to a network.

(Other Embodiments)

The object of the present invention is also achieved by supplying a recording medium which records software program codes for implementing the functions of the above-described embodiment to a system or apparatus, and reading out and executing the program codes recorded in the recording medium by the computer (or the CPU or MPU) of the system or apparatus.

In this case, the program codes read out from the computer-readable recording medium implement the functions of the above-described embodiment, and the recording medium which records the program codes constitutes the present invention.

The recording medium for supplying the program codes includes a flexible disk, hard disk, optical disk, magnetooptical disk, CD-ROM, CD-R, magnetic tape, nonvolatile memory card, and ROM.

The functions of the above-described embodiment are implemented when the computer executes the readout program codes. Also, the present invention includes a case where an OS (Operating System) or the like running on the computer performs part or all of actual processing on the basis of the instructions of the program codes and thereby implements the functions of the above-described embodiment.

Furthermore, the present invention includes a case wherein, after the program codes read out from the recording medium are written in the memory of a function expansion board inserted into the computer or the memory of a function expansion unit connected to the computer, the CPU of the function expansion board or function expansion unit performs part or all of actual processing on the basis of the instructions of the program codes and thereby implements the functions of the above-described embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-287850, filed Nov. 5, 2007, which is hereby incorporated by reference herein in its entirety.

What is claimed is:

1. An image forming apparatus comprising:
   an input unit which inputs document data generated and stored in a portable recording medium by a client apparatus, the document data being input by the input unit when the portable recording medium is detached from the client apparatus and is attached to the image forming apparatus;
   a verification unit which verifies validity of the document data on the basis of verification information associated with the input document data;
   an output unit which forms and outputs an image on a print medium on the basis of the document data; and
   an output log storing control unit which, when said verification unit determines that the document data is valid, stores, in the portable recording medium, output log information containing no image output from said output unit, and when said verification unit determines that the document data is invalid, stores output log information containing the image in the portable recording medium,
   wherein the verification unit verifies that the document data is valid when the verification information indicates that the document data is registered in a management server that manacles output job information,
   wherein the verification unit verifies that the document data is invalid when the verification information indicates that the document data is not registered in the management server, and
   wherein the output log storing control unit stores first information in the portable recording medium, when said verification unit determines that the document data is registered in the management server, the first information comprising output log information including environment information regarding the outputting of said output unit but not including the image output from said output unit, and stores second information in the portable recording medium, when said verification unit determines that the document data is not registered in the management server, the second information comprising output log information including the environment information regarding the outputting of said output unit and including the image output from said output unit.

2. The apparatus according to claim 1, further comprising a determination unit which determines whether verification information associated with the document data input from said input unit exists,
   wherein when said determination unit determines that no verification information exists, said output log storing control unit stores the output log information containing the image in the portable recording medium.

3. The apparatus according to claim 1, further comprising:
an area determination unit which determines whether a free area for storing output log information exists in the portable recording medium; and
a control unit which, when said area determination unit determines that the free area for storing output log information does not exist in the portable recording medium, inhibits execution of outputting the document data from said output unit.

4. The apparatus according to claim 1, wherein the image forming apparatus is communicatively disconnected from a management server apparatus when the output log storing control unit stores in the portable recording medium either the output log information containing no image output from said output unit or the output log information containing the image.

5. A method of controlling an image forming apparatus, the method comprising:
an input step of inputting document data generated and stored in a portable recording medium by a client apparatus, the document data being input by the input step when the portable recording medium is detached from the client apparatus and is attached to the image forming apparatus;
a verification step of verifying validity of the document data on the basis of verification information associated with the input document data;
an output step of forming and outputting an image on a print medium on the basis of the document data; and
an output log storing control step of, when the document data is determined in the verification step to be valid, storing, in the portable recording medium, output log information containing no image output in the output step, and when the document data is determined to be invalid, storing output log information containing the image in the portable recording medium,
wherein each of said steps is implemented at least in part by a computer of the image forming apparatus,
wherein the verification step includes verifying that the document data is valid when the verification information indicates that the document data is registered in a management server that manages output job information,
wherein the verification step includes verifying that the document data is invalid when the verification information indicates that the document data is not registered in the management server, and
wherein the output log storing control step includes storing in the portable recording medium, when it is determined in said verification step that the document data is registered in the management server, output log information including environment information regarding the outputting in said output step but not including the image output in said output step, and storing in the portable recording medium, when it is determined in said verification step that the document data is not registered in the management server, output log information including the environment information regarding the outputting in said output step and including the image output in said output step.

6. The method according to claim 5, wherein the image forming apparatus is communicatively disconnected from a management server apparatus when the output log storing control step stores in the portable recording medium either the output log information containing no image output in said output step or the output log information containing the image.

7. A non-transitory computer-readable storage medium storing a computer program, the computer program causing at least a computer in an image forming apparatus to execute a method of controlling the image forming apparatus, the method comprising:
an input step of inputting document data generated and stored in a portable recording medium by a client apparatus, the document data being input by the input step when the portable recording medium is detached from the client apparatus and is attached to the image forming apparatus,
a verification step of verifying validity of the document data on the basis of verification information associated with the input document data, an output step of forming and outputting an image on a print medium on the basis of the document data, and
an output log storing control step of, when the document data is determined in the verification step to be valid, storing, in the portable recording medium, output log information containing no image output in the output step, and when the document data is determined in the verification step to be invalid, storing output log information containing the image in the portable recording medium,
wherein the verification step includes verifying that the document data is valid when the verification information indicates that the document data is registered in a management server that manages output job information,
wherein the verification step includes verifying that the document data is invalid when the verification information indicates that the document data is not registered in the management server, and
wherein the output log storing control step includes storing in the portable recording medium, when it is determined in said verification step that the document data is registered in the management server, output log information including environment information regarding the outputting in said output step but not including the image output in said output step, and storing in the portable recording medium, when it is determined in said verification step that the document data is not registered in the management server, output log information including the environment information regarding the outputting in said output step and including the image output in said output step.

8. The non-transitory computer-readable storage medium according to claim 7, wherein the image forming apparatus is communicatively disconnected from a management server apparatus when the output log storing control step stores in the portable recording medium either the output log information containing no image output in said output step or the output log information containing the image.

* * * * *